(12) United States Patent
Drouet et al.

(10) Patent No.: US 7,698,384 B2
(45) Date of Patent: Apr. 13, 2010

(54) INFORMATION COLLECTING SYSTEM FOR PROVIDING CONNECTION INFORMATION TO AN APPLICATION IN AN IP NETWORK

(75) Inventors: Francois-Xavier Drouet, Nice (FR); Fréderic Lefevre, La Gaude (FR); Gérard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1304 days.

(21) Appl. No.: 10/874,595

(22) Filed: Jun. 23, 2004

(65) Prior Publication Data

US 2005/0021746 A1 Jan. 27, 2005

(30) Foreign Application Priority Data

Jun. 26, 2003 (EP) ................... 03368055

(51) Int. Cl.
 *G06F 15/16* (2006.01)
(52) U.S. Cl. ................. 709/219; 709/203; 709/249
(58) Field of Classification Search ......... 709/217–219, 709/203, 223–224, 249; 726/12, 14
 See application file for complete search history.

(56) References Cited

U.S. PATENT DOCUMENTS

| 5,905,872 | A  | * | 5/1999  | DeSimone et al. ......... 709/245 |
| 6,092,196 | A  | * | 7/2000  | Reiche ........................ 726/6 |
| 6,377,955 | B1 | * | 4/2002  | Hartmann et al. ........ 707/104.1 |
| 6,608,832 | B2 | * | 8/2003  | Forslow ..................... 370/353 |
| 2001/0044893 | A1 | * | 11/2001 | Skemer ....................... 713/153 |
| 2002/0006132 | A1 | * | 1/2002  | Chuah et al. ................ 370/401 |
| 2002/0091636 | A1 | * | 7/2002  | Carroll Bullard ............ 705/40 |
| 2003/0050918 | A1 | * | 3/2003  | Pilkington et al. ............. 707/1 |
| 2003/0051041 | A1 | * | 3/2003  | Kalavade et al. ............ 709/229 |
| 2003/0056096 | A1 | * | 3/2003  | Albert et al. ................ 713/168 |
| 2003/0233329 | A1 | * | 12/2003 | Laraki et al. ................. 705/52 |
| 2006/0236241 | A1 | * | 10/2006 | Harada et al. ............... 715/700 |

FOREIGN PATENT DOCUMENTS

WO    WO9962036    * 12/1999

OTHER PUBLICATIONS

Rigney, C., et al., RFC 2865 Remote Authentication Dial In User Service (RADIUS), Jun. 2002.*

(Continued)

*Primary Examiner*—Saleh Najjar
*Assistant Examiner*—Sarah E Drabik
(74) *Attorney, Agent, or Firm*—Norman Gundel; Hoffman Warnick LLC

(57) ABSTRACT

Information collecting system wherein at least an Application Service Provider (ASP) provides services to a user through an Internet network and wherein there are at least an access network to which is connected the user and an Internet Service Provider (ISP) network connected to each access network by a RADIUS client, the Internet network being connected to the ISP network by a proxy. This system comprises a RADIUS Client Agent (RCA) connected to the ISP network and adapted to collect information about parameters of the connection of the user to the system, and at least a Provisioning Proxy Agent (PPA) adapted to receive the information from the RCA and to add this information in the request sent by the user to the ASP.

3 Claims, 2 Drawing Sheets

OTHER PUBLICATIONS

Rigney, C., RFC 2866 "RADIUS Accounting", Jun. 2000.*
Rigney, C., et al., RFC 2869 "RADIUS Extensions", Jun. 2000, Section 5.11.*
Aboba, B., et al., RFC 2607 "Proxy Chaining and Policy Implementation in Roaming", Jun. 1999.*
Rigney, C., et al., RFC 2865 "Remote Authentication Dial in User Service (RADIUS)", Jun. 2002.*
Rigney, C., RFC 2866 "RADIUS Accouting", Jun. 2000.*
Rigney, C., et al., RFC 2869 "RADIUS Extensions", Jun. 2000, Section 5.11.*
Aboba, B., et al., RFC 2607 "Proxy Chaining and Policy Implementation in Roaming", Jun. 1999.*
Rigney, C., et al., RFC 2865: "Remote Authentication Dial in User Service (RADIUS)", Jun. 2002.*
Rigney, C., et al., RFC 2869: "Radius Extensions", Jun. 2000, Section 5.11.*
Aboba, B., et al., RFC 2607: "Proxy Chaining and Policy Implementation in Roaming", Jun. 1999.*

* cited by examiner

INFORMATION COLLECTING SYSTEM FOR PROVIDING CONNECTION INFORMATION TO AN APPLICATION IN AN IP NETWORK

TECHNICAL FIELD

The present invention generally relates to the access of applications provided in an IP network such as Internet and more particularly relates to an information collecting system for providing connection information to an application in an IP Network.

BACKGROUND

The access of users to internet services through a private or public IP network, such as a Public Switched Telephone Network (PSTN), a General Packet Radio Service (GPRS), etc., must be controlled for reason of security and to avoid useless load of network lines. Companies providing remote access to their servers, such as web content servers, often share the services of authentication using a Remote Access dial-in User Services (RADIUS) server to control remote user connections. The protocol for authentication and authorization is defined in the Request For Comment (RFC) documents RFC 2865 and the RADIUS protocol for accounting is defined in the RFC 2866. The RADIUS server performs authentication of users and checks that the remote users are authorized to be connected to the network, in order to access the content servers through the IP network. The RADIUS server is also in charge of collecting accurate accounting of connection time so that the users may be billed correctly by the content servers.

Users can connect to an IP Network in numerous ways, including through a PSTN, GPRS, digital subscriber lines (xDSL), and wireless network WI-FI. Such a connection is made by means of access servers acting as gateways which are installed at the periphery of the IP network. The access server establishes a user session using the services of a RADIUS server. The RADIUS server performs the authentication, checking the password received from a user and provides an authorization to connect according to the network capacity. The access server sends an IP address to the user and acts as a router to the IP servers once a session is established. When a session is established, it asks the RADIUS server to start the accounting for this session. When the user is disconnected by the network, the access server asks the RADIUS server to stop the accounting for this session. One RADIUS server can collect accounting information for a set of access servers. Using the accounting information, a bill for the connection to IP content servers is created and sent to the user.

The application service providers (ASP) have to adapt their services according to the type of access network used by their customers. Thus, a customer can now have access to video services through GPRS, WI-FI, PSTN or a leased line and the connection parameters used by the ASP will be different according to the access network being used. However, these connection parameters, such as identification, speed or bandwidth are not provided today at the application level. This could be detrimental for some specific services such as media distribution. In some cases, this needed information can be retrieved by the web application from the RADIUS server session table using the client IP address. Unfortunately, these solutions do not work if there is a proxy or a firewall in mode proxy between the user and the web application.

Another solution consists in requesting some information from the user, such as the quality of the video being received according to the speed or bandwidth. But, in most cases, the user is not able to answer or is unable to determine the speed negotiated by the modem. Furthermore, the RADIUS server has no open interface to provide connection information in real time to third party application (proxy, application server . . . ).

SUMMARY OF THE INVENTION

Accordingly, an object of the invention is to provide a system for collecting information on connection characteristics for application service providers in order to offer a good quality of service to their customers.

Another object of the invention is to provide information enabling functions such as automatic recognition of a user in order to provide automatic logon to applications.

The invention therefore relates to an information collecting system wherein at least an Application Service Provider (ASP) provides services to a user through an Internet network and wherein there are at least an Internet Service Provider controlling an access network to which is connected the user and an Internet Service Provider (ISP) network connected to each access network, the Internet network being connected to the ISP network by a proxy. Such a system comprises a Remote Access Dial-in User Server (RADIUS) Client Agent (RCA) connected to the ISP network and adapted to collect information about parameters of the connection of the user to the system, and at least a Provisioning Proxy Agent (PPA) adapted to receive the information from the RCA and to add this information in a request sent by the user to the ASP.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
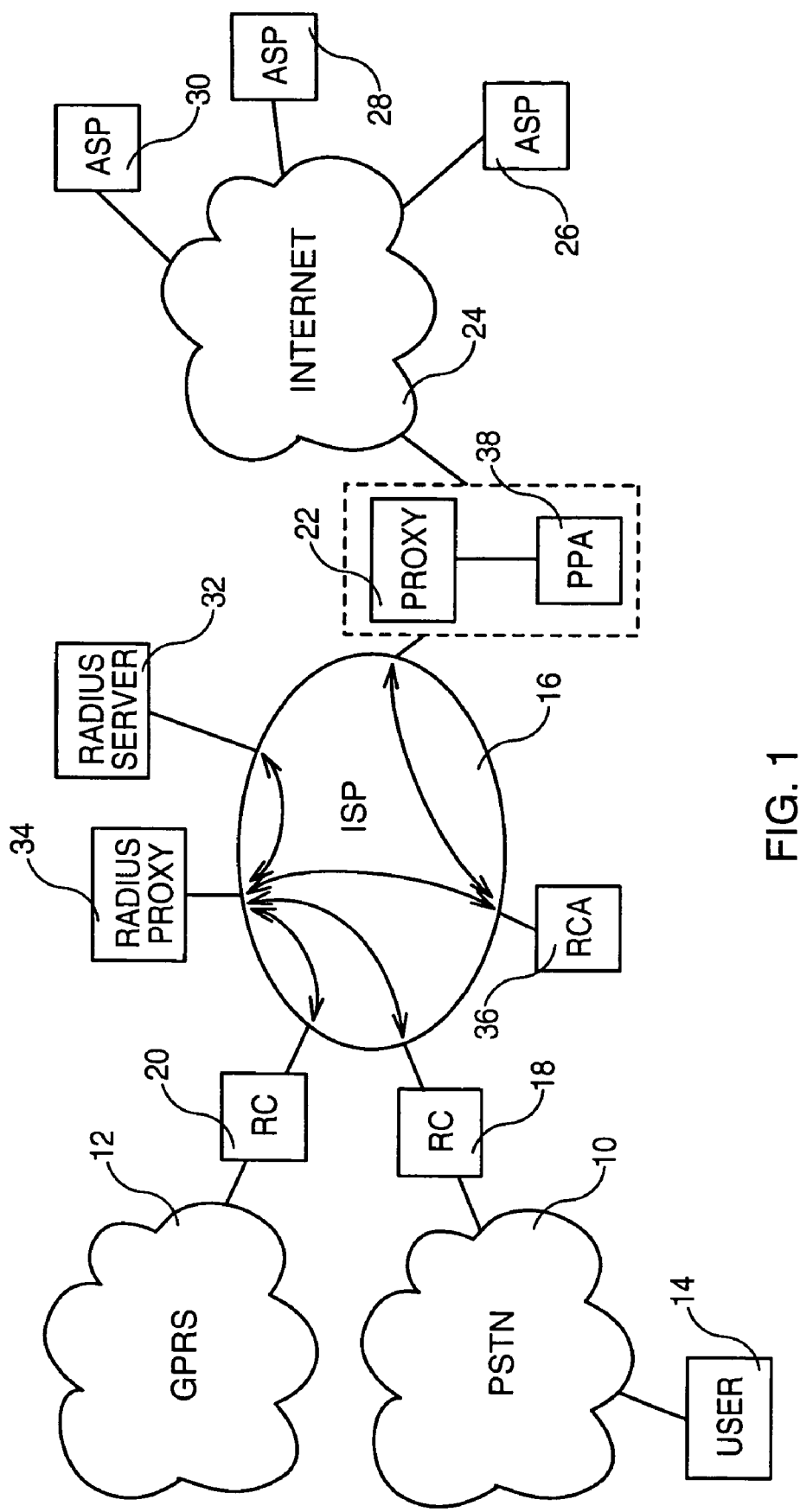
FIG. 1 is a block-diagram representing a system implementing the invention.

A system according to the invention illustrated in FIG. 1 includes one or several access networks (e.g., a PSTN network 10 and a GPRS network 12) to which are connected users, such as user 14. Each access network 10, 12 is connected to an Internet Service Provider (ISP) network 16 (e.g., a LAN) by means of RADIUS (Remote Access Dial-in User Server) clients, such as RADIUS client 18 connected to PSTN 10 or RADIUS client 20 connected to GPRS 12. It must be noted that other access networks could be used such as xDSL or a WI-FI network.

The ISP network 16 is connected by means of a proxy 22 to the Internet network 24 enabling each user, such as user 14, to gain access to services provided by a plurality of Application Service Providers (ASP) 26, 28 or 30.

By using a RADIUS protocol, the request of authentication and authorization of a user requesting services to the ISP is sent to a RADIUS server 32 connected to the ISP network 16 by the intermediary of a proxy RADIUS server 34, which receives the request directly from the RADIUS client 18 or 20.

The application service providers (ASP) have to adapt their services according to the type of access network used by the customer. Thus, the parameters to be used to access the video services will be different according to whether a GPRS, PSTN or WI-FI network is used. For this, the ASP needs information about the type of connectivity being used, such as identification, speed and bandwidth. Unfortunately, this information is not provided at the application level.

The solution to the above problem consists in taking advantage of the RADIUS protocol used to authenticate the user by the RADIUS server and to authorize the access. After the access has been authorized, the RADIUS server 32 sends a response (Access-accept) to the RADIUS client 18 or 20. The RADIUS client 18 or 20 then sends an accounting start to start the session and an accounting stop at the end of the session. Thus, the RADIUS protocol allows triggering a RADIUS client Agent (RCA) 36 responsible to gather and send information related to the user and the connection. Such information is then sent by the RCA 36 to a Provisioning Proxy Agent (PPA) 38 which is, in a preferred embodiment, incorporated in the proxy server 22. The PPA 38 configures the proxy server 22 to add the information in the user's request. The proxy can use this information to build a cookie or to add an HTTP header in the HTTP requests to the destination of the application. It must be noted that the RCA 36 can receive information from several RADIUS clients but may also gather information directly from the modems by using Simple Network Management Protocol (SNMP) commands.

Figure 2:
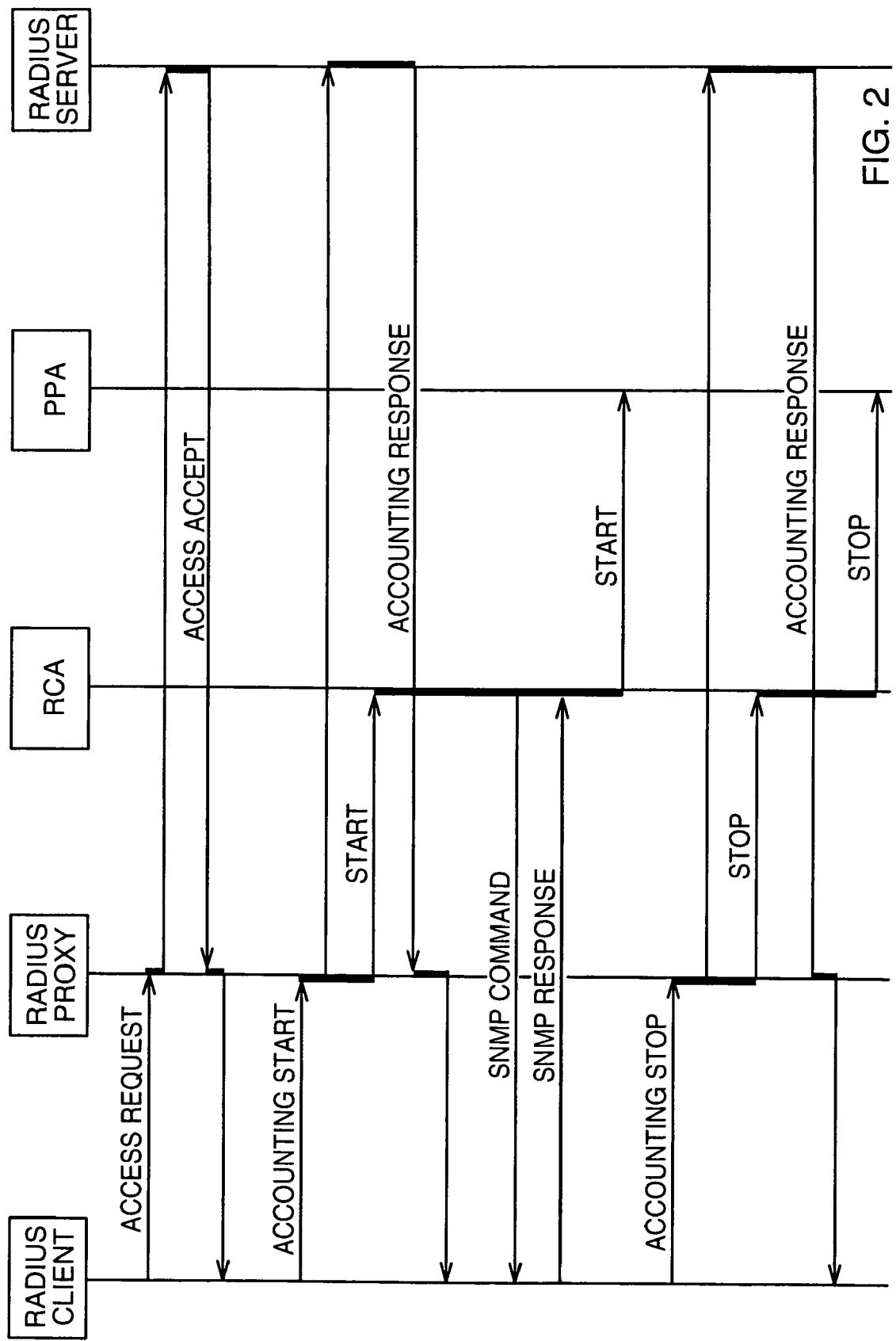
FIG. 2 is a time diagram representing the steps realized for implementing the system illustrated in FIG. 1.

In reference to FIG. 2, the process implemented in the invention begins when an Access Request is sent from the RADIUS client to the RADIUS proxy. This request, which includes the logon and password of the user, is then forwarded to the RADIUS server which returns an Access Accept including the IP address of the user of this session. All the information exchanged by using the RADIUS protocol is intercepted by the RADIUS proxy, which thus keeps track of the user name, the password, the RADIUS client address, and the RADIUS client port. Note that the IP address could be allocated by the RADIUS client.

After receiving the acceptation of the session, the RADIUS client sends an Accounting start to the RADIUS server, which includes the logon/password of the user, the port number, the type of connection and the IP address of the user. The RADIUS server returns an Accounting response. In the same way as for the Access request, the RADIUS proxy intercepts the Accounting start and forwards a Start message including the RADIUS client IP address and the port to the RCA. Optionally, the RCA can send a SNMP command to the RADIUS client in order to retrieve some information and principally the speed negotiated during the connection by the modem for the port number being used. All the information consolidated by the RCA is forwarded in a Start message to the PPA, which is responsible to set up the proxy server to either set a cookie, add HTTP header information or an URL extension containing the information needed by the destination application.

At the end of the session, the RADIUS client sends an Accounting stop containing the same information as the Accounting start to the RADIUS server, which returns an Accounting response to the RADIUS client. In the same way as for the Accounting start, the Accounting stop and its response are intercepted by the RADIUS proxy. The RADIUS proxy forwards a Stop message to the RCA, which also sends a Stop message to the PPA indicating thereto that the session is ended for this IP address.

When the RCA forwards the Start message to the PPA, the PPA stores the received information in a session table containing three columns defining the session identifier (the user IP address), the parameter name and the parameter value. Such a session table could be the following:

| USER ID ADDRESS | PARAMETER NAME | PARAMETER VALUE |
| --- | --- | --- |
| XX.YY.ZZ.WW | Login | User1 |
| XX.YY.ZZ.WW | Password | User1 psswd |
| XX.YY.ZZ.WW | Connection-type | GPRS |
| XX.YY.ZZ.WW | Connection speed | 46K |
| XX.YY.ZZ.WW | Priority level | 3 |

All entries corresponding to an IP address are removed from the session table on reception of a Stop message sent by the RCA as described previously. Note that, further to the Start message which adds entries into the session table and the Stop message which deletes entries from the session table, some entries can be updated in case of modification of the session characteristics by an Update message received from the RCA.

An RCA needs to know which PPA has to be warned of start, stop or change for a given set of connections. A PPA associated with a particular proxy server has to register itself to the RCA. For this, the PPA gives to the RCA the filter to identify the user session for which the RCA must propagate the session information. The filter is useful for limiting the traffic between the RCA and the PPA. Many times, the incoming traffic is divided between several proxies. This division may be based on different mechanisms as those proposed for the PPA filter. Therefore, defining a PPA filter which matches the traffic division between proxies allows optimization of the traffic between the RCA and the PPAs. In most cases, a PPA will not receive information about a connection that will flow to another proxy than the one on which the PPA is attached.

The filter may be one of the following: a range of IP addresses, a Realm, a RADIUS client IP address, or a called number (often associated with a Realm). Upon reception of a registration message from a PPA, the RCA builds or updates a table. Each row of the table represents a filter for a given PPA. Thus, when a Start message is received by the RCA, the RCA can identify all the rows for which the filter matches the session parameters. An example of such a table is as follow:

| PPA IP@ | PPA port | lowIP@ | highIP@ | Realm | nasIP@ |
| --- | --- | --- | --- | --- | --- |
| 9.100.50.10 | 10041 | 9.100.100.1 | 9.100.100.90 | — | — |
| 9.100.50.10 | 10041 | 9.100.100.200 | 9.100.100.255 | — | — |
| 9.100.50.20 | 10067 | — | — | lagaude.ibm.com | — |
| 9.100.50.20 | 10067 | — | — | raleigh.ibm.com | — |
| 9.100.50.30 | 10041 | — | — | — | 9.100.10.10 |

After the connection phase described in reference to FIG. 2, the proxy receives HTTP requests from the users. Each HTTP request may be transformed to pass parameters to the applications. For this, the PPA can build a table associated with each application as follows:

| ASP Base URL | Proxy Plug in | Configfuration properties |
|---|---|---|
| Http://host.name/dir | Standard HTTP Headers | HTTP Headers name and presence |
| Http://host2.name/dir2 | Custom ASP2 plugin | Custom plugin parameters |

For each ASP URL, this table gives the Plug-in to be called by the proxy when receiving a request for this ASP. Such a Plug-in may be the standard HTTP headers plug-in which adds the session parameters as HTTP headers. These parameters may be the logon user and password. This allows, in particular, to match all applications working with basic HTTP authentication (HTTP Authentication: Basic and Digest Access Authentication, RFC 2617). The Plug-in may also be a custom ASP Plug-in which may build the information inside cookies, for instance. The last column of the table contains the configuration parameters for this ASP. In case of the "standard HTTP headers" Plug-in, the configuration parameters define what session parameters are to be included in the HTTP request (e.g., The user ID and the password) and the names of the HTTP header which holds the session parameters to be included. Note that this application table is created by the administrator depending on the application available. It is updated by the administrator each time an application is added or suppressed.

Naturally, in order to satisfy local and specific requirements, a person skilled in the art may apply to the solution described above many modifications and alterations all of which, however, are included within the scope of protection of the invention as defined by the following claims.

The invention claimed is:

1. An information collecting system, comprising:
   an Application Service Provider (ASP) for providing services to a user through an Internet network;
   at least one access network to which said user is connected;
   an Internet Service Provider (ISP) network connected to each access network by a Remote Access Dial-in User Server (RADIUS) client, said Internet network being connected to said ISP network by a proxy;
   a RADIUS Client Agent (RCA) connected to said ISP network and adapted to collect information from the RADIUS client about parameters of the connection of said user to the system, and
   at least a Provisioning Proxy Agent (PPA) adapted to receive said information from said RCA and, according to the received information, configure the proxy connecting the Internet network to ISP network to add said information in a request sent by the user to said ASP by setting a cookie or a URL extension containing the information needed by the ASP,
   wherein said information about the parameters of the user connection includes an identification of the user, a connection type of the user to the ISP and a connection speed of the user to the ISP,
   wherein said PPA includes a session table defining, for each user IP address, values of said parameters of the user connection,
   wherein said RCA includes a table containing in each row a filter for a PPA associated with said RCA, said filter being either a range of IP addresses, a Realm, a RADIUS client IP address or a called number,
   wherein said PPA includes an application table enabling said proxy to determine said information in each user request transmitted to said ASP, and
   wherein said application table provides for a URL contained in said request a proxy Plug-in.

2. The information collecting system according to claim 1, wherein said PPA is incorporated in said proxy.

3. A method of collecting information in a system wherein at least an Application Service Provider (ASP) provides services to a user through an Internet network and wherein the system includes at least an access network to which said user is connected and an Internet Service Provider (ISP) network connected to each access network by a Remote Access Dial-in User Server (RADIUS) client, said Internet network being connected to said ISP network by a proxy,
   said method comprising:
   collecting by a RADIUS Client Agent (RCA) connected to said ISP network information from the RADIUS client about parameters of the connection for a user request to said ASP, wherein the information about the parameters of the connection for the user includes an identification of the user, a connection type of the user to the ISP and a connection speed of the user to the ISP,
   providing by a Provisioning Proxy Agent (PPA) to said proxy all said information about the user connection parameters collected by said RCA, and
   adding by said proxy said information in said user request before sending it to said ASP by setting a cookie or a URL extension containing the information needed by the ASP, wherein the proxy connecting the Internet network to the ISP network is configured according to the information,
   wherein a session table in said PPA defines, for each user IP address, values of said user connection parameters,
   wherein a table in said RCA contains in each row a filter for a PPA associated with said RCA, said filter being either a range of IP addresses, a Realm, a RADIUS client IP address or a called number,
   wherein an application table in said PPA enables said proxy to determine said information in each user request transmitted to said ASP, and
   wherein said application table provides for a URL contained in said request a proxy Plug-in.

* * * * *